Jan. 4, 1944.   R. C. TIMM   2,338,690
VALVE ACTION
Filed July 18, 1941

INVENTOR
ROY C. TIMM
BY
Beau, Brooks, Buckley & Beau
ATTORNEYS

Patented Jan. 4, 1944

2,338,690

UNITED STATES PATENT OFFICE 2,338,690

VALVE ACTION

Roy C. Timm, Buffalo, N. Y., assignor to Trico Products Corporation, Buffalo, N. Y.

Application July 18, 1941, Serial No. 402,929

11 Claims. (Cl. 121—97)

This invention relates to fluid motors and particularly to fluid motors of the general class employed in actuating vehicle windshield cleaners with air pressure or partial vacuum as the energy source.

Fluid motors of the kind indicated above are conventionally of the reciprocating type and generally employ relatively light snap acting valve mechanisms for effecting reversal of the fluid connections at the end of each reciprocation of the movable element of the motor. The present invention effects improvements in such snap actions and, as a result of such improvements, smoother and substantially quieter operation of the snap acting valve mechanism is attained. Fluid motors of this class are generally disposed fairly close to the operator of the vehicle equipped therewith and silence of operation is therefore a prime consideration. The increased smoothness and novel damping of the instant valve mechanism also contributes to longer life and freedom from breakage of the mechanism.

The improved operation of the snap action mechanism of the present invention is achieved in part by introducing a new relationship as respects the physical mass of the cooperating parts, whereby the forces of inertia are utilized to smooth the final snapover of the mechanism. The general object of the invention is further contributed to by combining with this inertia action a spring snubbing cooperation, as will appear from a study of the herein disclosed exemplary form of the invention.

While a single complete embodiment of the principles of the present invention is illustrated in the drawing and described in detail in the following specification, it is to be understood that such embodiment is by way of example merely and the principles of this invention are not to be considered as limited otherwise than as defined in the appended claims.

Figure 1:
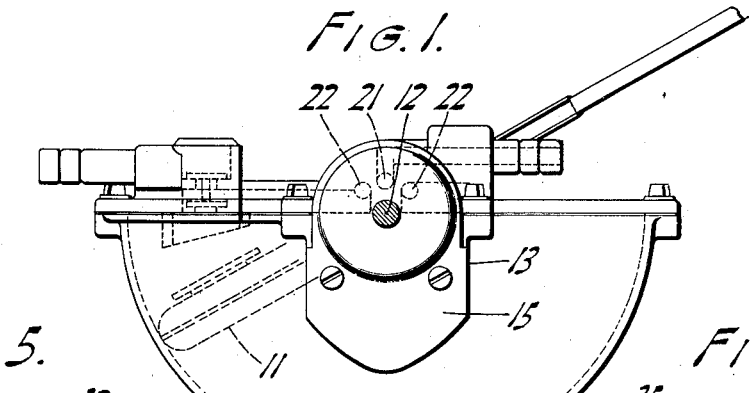
Fig. 1 is a general elevational view of a fluid pressure motor of the class widely used in actuating automatic windshield wipers.
Figure 5:
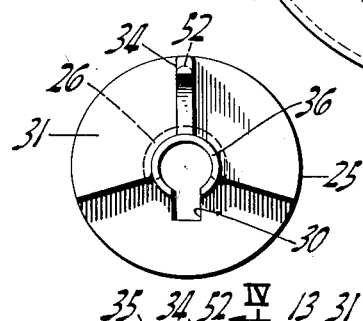

In the drawing like characters of reference denote like parts throughout the several figures and the numeral 10 designates a motor casing of arcuate outline having a vane or piston 11 carried by a rock shaft 12 for oscillation in the casing. The rock shaft 12 is journaled in the casing at its ends and has a portion projecting into a valve housing 13 formed on the casing 10.

The improvements of the present invention may have application in the construction of snap acting valve mechanisms of the kind disclosed in United States Letters Patent to Erwin C. Horton et al., No. 2,032,319, dated February 25, 1936, and reference may be had thereto for details of construction not important to the present invention and accordingly not extensively dealt with herein.

In the interests of simplicity, it may be stated that the exemplary form of the present invention varies from the construction of the Letters Patent referred to only in the construction of the valve shifting element, the spring supporting stirrup, and the manner of assembling the valve shifting element with the rock shaft of the motor. In the Letters Patent referred to the valve shifting mechanism and, in fact, the entire fluid pressure motor is shown upside down as compared with the motor and valve mechanism of the instant invention.

By virtue of the construction herein proposed, the rock shaft 12 of the motor may extend completely through the valve housing 13 and the mechanism contained therein and through a conventional cover member 15 which encloses the valve housing. At its outer terminus, the rock shaft 12 is shown in the present instance as provided with a hand manipulating lever 16 which may be secured to the rock shaft 12 as by means of a set screw 17.

The rock shaft 12 pivotally supports a valve element 20 which seats against a flat valve face formed within the valve housing 13. The valve seating face is provided with a central fluid pressure supply port 21 and ports 22 at opposite sides thereof in communication with the interior of the motor casing 10 at opposite sides of the vane 11. The valve 20 has an arcuately extending blind recess 23 which may connect the port 21 alternately with either of the ports 22. The body of the valve 20 is so formed as to leave the unconnected port 22 open to atmosphere.

The valve shifting member proper, in the present illustrated form, comprises a disc-shaped element 25 which is rotatably disposed about the rock shaft 12. Providing the valve shifting member in the shape of a disc permits the incorporation therein of sufficient mass to have a substantial inertia effect without requiring substantial rearrangement of the valve shifting elements. This is important because of the present valve shifting arrangement is highly desirable from the standpoint of simplicity, effectiveness, ease of manufacture of the component parts and facility of assembly.

The valve shifting element 25 preferably has limited free rotative movement with respect to the rock shaft 12 and to that end is provided with a hub 26 which has an arcuate portion thereof removed to permit the hub to straddle a pin 28 projecting from and rigidly carried by the rock shaft 12. It will be noted that movement of the rock shaft in either direction does not cause the disc 25 to move therewith until a side of the pin 28 of the rock shaft 12 engages an adjacent face of the partial hub 26. To facilitate initial assembly, the disc proper has an opening 30 which is just large enough to pass the pin 28 to dispose the latter in line with the hub 26. It will be noted from a consideration of Fig. 2 that the member 25 is retained in assembled position on the rock shaft 12 by engagement of the cover member 15 against the face of the hub 26.

In addition to the novel formation of the valve shifting element in disc form, and to serve further in increasing the relative mass of the element 25 without sacrificing the present compactness of the valve shifting mechanism, the member 25 is provided with an arcuately extending projection 31 which adds substantially to the mass of the valve shifting element, likewise without reducing the available space for the other elements essential to the construction of valve shifting mechanism of the general type here under consideration. Specifically, the arcuate projection 31 leaves a lower segmentally-shaped pocket which provides space for the accommodation of a spring presently to be described.

A valve shifting arm 34 is preferably formed integrally with the disc element 25 and projects to a point of engagement between arcuately spaced ears 35 of the valve 20 for alternate engagement therewith to effect shifting of the valve 20 and thereby alternately connect opposite sides of the motor with the source of fluid operating pressure. If desired, a second hub, directed toward the valve 20, may be formed on the disc element 25, as at 36, and such hub may be utilized to properly locate the disc element axially with respect to the remainder of the mechanism.

In addition to the play connection between the pin 28 and the hub 26, it will be noted that the arm 34 of the valve shifting disc 25 has substantial idle movement between the ears 35 of the valve 20 before the arm 34 engages one of the ears 35 to effect shifting of the valve. This idle movement is employed in loading spring means which are suddenly released by over-center movement to result in quick shifting of the valve at a time when the idle movement of the arm 34 between the ears 35 is substantially complete and as the arm 34 substantially reaches an ear 35 in its oscillating movement.

Figure 2:
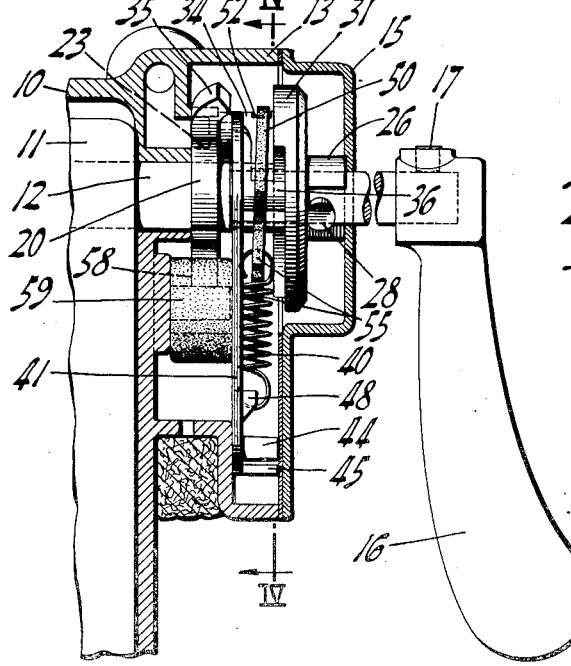
Fig. 2 is a fragmentary, transverse, cross sectional view through the valve actuating mechanism portion of the motor of Fig. 1, one form of the novel valve actuating mechanism of the present invention being incorporated therein.
Figure 3:
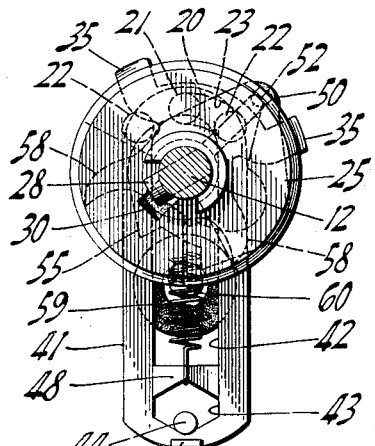
Fig. 3 is an enlarged, elevational view of the valve actuating mechanism portion of the invention viewed as in Fig. 1 but on an enlarged scale and with the conventional cover member removed.

To effect such spring loading and sudden release the instant mechanism preferably includes a tension coil spring 40 and for fixedly supporting one end of the spring 40 there is preferably provided a plate 41 which serves additionally to yieldably hold the valve 20 against its seat face. The plate 41 has an elongate slot 42 whose upper end, as viewed in Figs. 2 and 3, is disposed over the rock shaft 12 and the inner hub 36 of the disc element 25. The lower end of the plate 41 has an opening 43 for disposal over a pin 44 carried rigidly by the casing 10. A lateral flange 45 may be formed on the plate 41 for engagement with the inside of the cover 15 to prevent displacement of the lower portion of the plate 41 in an axial direction.

The plate 41 has an offset portion 48 for engaging the lower end of the spring 40 and because of the offset disposition of the portion 48 tensile force of the spring 40 is applied to the plate 41 in such manner as to tend to rotate it in a counterclockwise direction, as viewed in Fig. 2, about its lower anchorage. This tendency is translated to the valve 20 by pressure of the upper portion of the plate 41 thereagainst.

The upper end of the spring 40 is hooked over the lower portion of a loop-like stirrup 50 whose upper portion is hung over the arm 34 of the valve shifting element, and is preferably disposed in a notch 52 formed in the arm 34. It will be noted that the upper part of the opening in the stirrup 50 is V-shaped and so proportioned as to engage against an opposite side of the arm 34 in each extreme of oscillating movement to define the limit movement thereof.

Figure 4:
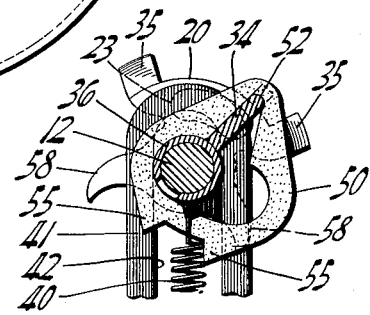
Fig. 4 is a fragmentary, cross sectional view taken approximately on the line IV—IV of Fig. 2; and, Fig. 5 is a detailed, elevational view of the valve shifting element of the mechanism viewed in an opposite direction to that of Fig. 3.

The lower edge of the stirrup 50 is provided with spaced ears 55 and, as appears clearly in Fig. 4, an ear 55 engages against a side of the upper portion of the spring 40 as each extreme of movement is approached. This engagement cushions the final shifting of the mechanism and its efficacy in the damping of vibrational tendencies may be enhanced by forming the stirrup member of non-metallic material, such as laminated impregnated fabric or the like.

It will appear from the foregoing that the valve shifting element 25 has a relatively slow increment of movement beginning when the pin 28 of the rock shaft 12 meets an edge of the hub 26 and continuing until the line of the spring 40 passes dead center. This is followed by a relatively rapid increment of movement under the impetus of the spring 40, during which the valve position is actually shifted. The beginning of the rapid increment of movement is smoothed by the relatively increased mass of the element 25, whose acceleration by the spring 40 is temporarily impeded. Silent stopping of the valve 20 and the element 25 in limit position is assured by virtue of alternate engagement of a pair of spaced projecting ears 58 of the valve 20 with an annular cushion bumper 59 which is loosely mounted on a pin 60 in the valve housing 13. The ears 58 and the bumper 59 cooperate with the snubbing action of the engagement of the spring 40 with the ears 55 to absorb the kinetic energy stored in the valve shifting element 25 by the spring 40.

What is claimed is:

1. A fluid operated motor having a member reciprocable under the influence of differential fluid pressure, a fluid pressure supply conduit and valve mechanism for alternately reversing the fluid pressure supply to said motor, said mechanism comprising valve means movable in opposite directions for effecting such reversals and an operator for alternately shifting said valve in opposite directions, a shaft pivotally supporting said operator, and an over-center spring arranged to be stressed during the first part of the movement of said operator and to subsequently act upon said operator to move the same and effect shifting of the valve, said operator having sufficient mass to impose substantial inertia resistance to acceleration thereof by said over-center spring and thereby quiet the snap-over action of said mechanism.

2. A fluid operated motor having a member reciprocable under the influence of differential fluid pressure, a fluid pressure supply conduit and valve mechanism for alternately reversing the fluid pressure supply to said motor, said mechanism comprising valve means movable in opposite directions for effecting such reversals and an operator for alternately shifting said valve in opposite directions, a shaft pivotally supporting said operator, an over-center spring arranged to be stressed during the first part of the movement of said operator and to subsequently act upon said operator to move the same and effect shifting of the valve, and an inertia body carried by said operator to impose substantial inertia resistance to acceleration of said operator by said over-center spring and thereby quiet the snap-over action of said mechanism.

3. A fluid operated motor having a member reciprocable under the influence of differential fluid pressure, a fluid pressure supply conduit and valve mechanism for alternately reversing the fluid pressure supply to said motor, said mechanism comprising valve means movable in opposite directions for effecting such reversals and an operator for alternately shifting said valve in opposite directions, a shaft pivotally supporting said operator, an over-center spring arranged to be stressed during the first part of the movement of said operator and to subsequently move the same and effect shifting of the valve, and an inertia body movable with said operator to impose substantial inertia resistance to acceleration of said operator by said over-center spring and thereby quiet the snap-over action of said mechanism.

4. A fluid operated motor comprising a casing having a piston oscillatable therein under the influence of differential fluid pressure, a rock shaft fixed for oscillation with said piston, a fluid pressure supply conduit and valve mechanism for alternately directing the fluid pressure into said casing at opposite sides of said piston, said mechanism comprising valve means movable in opposite directions for effecting such alternations and an operator for alternately shifting said valve in opposite directions, said operator being carried by said rock shaft and adapted to be oscillated thereby, an over-center spring arranged to be stressed during the first part of the movement of said operator and to subsequently move the same and effect shifting of the valve, said operator being of substantially greater mass, relative to the other movable elements of the valve mechanism, whereby to impose substantial inertia resistance to acceleration thereof by said over-center spring and thereby quiet the snap-over action of said mechanism.

5. A fluid operated motor having a member reciprocable under the influence of differential fluid pressure, a fluid pressure supply conduit and valve mechanism for alternately reversing the fluid pressure supply to said motor, said mechanism comprising valve means movable in opposite directions for effecting such reversals and an operator for alternately shifting said valve in opposite directions, a shaft pivotally supporting said operator, an over-center spring arranged to be stressed during the first part of the movement of said operator and to subsequently move the same and effect shifting of the valve, said operator having sufficient mass to impose substantial inertia resistance to acceleration thereof by said over-center spring and thereby quiet the snap-over action of said mechanism, and a link member pivotally engaging said operator and an end of said over-center spring to support the latter, and means on said link member engageable with the body of said spring at opposite sides thereof as each end of a valve-shifting movement is approached to silence the arresting of said operator.

6. A fluid operated motor having a member reciprocable under the influence of differential fluid pressure, a fluid pressure supply conduit and valve mechanism for alternately reversing the fluid pressure supply to said motor, said mechanism comprising valve means movable in opposite directions for effecting such reversals and a weighted valve operator for alternately shifting said valve in opposite directions, a shaft pivotally supporting said operator, and an over-center spring arranged to be stressed during the first part of the movement of said operator and to subsequently act upon said operator to move the same and effect shifting of the valve, said weighted valve operator being proportioned to impose substantial inertia resistance to acceleration thereof by said over-center spring and thereby quiet the snap-over action of said mechanism.

7. A fluid operated motor having a member reciprocable under the influence of differential fluid pressure, a fluid pressure supply conduit and valve mechanism for alternately reversing the fluid pressure supply to said motor, said mechanism comprising valve means movable in opposite directions for effecting such reversals and a weighted valve operator for alternately shifting said valve in opposite directions, a shaft pivotally supporting said weighted valve operator, an over-center spring arranged to be stressed during the first part of the movement of said operator and to subsequently act upon said operator to move the same and effect shifting of the valve, said weighted valve operator being proportioned to impose substantial inertia resistance to acceleration of said operator by said over-center spring and thereby quiet the snap-over action of said mechanism, and a link member pivotally engaging said operator and an end of said over-center spring to support the latter, and means on said link member engageable with the body of said spring at opposite sides thereof as each end of a valve-shifting movement is approached to silence the arresting of said operator.

8. A valve mechanism for fluid motors comprising a valve movable back and forth on a seat between two positions, an oscillating operator for said valve, a pressure plate bearing against said valve and having an offset portion, an over-center spring engaging between said offset portion and said valve operator for being stressed during the first part of each stroke of said operator and to subsequently move the same and effect shifting of the valve, a cover for said valve mechanism, and an ear formed on said pressure plate and engaging said cover member to cause the pressure plate to pivot about said ear under the urge of said spring acting against said offset portion to urge said plate against said valve.

9. For use in snap-action valve mechanism, a valve shifter comprising a disc having a central aperture for pivotally mounting the same, and a valve shifting arm projecting from said disc in a direction substantially parallel to the axis thereof for engagement with a valve.

10. A valve mechanism for fluid motors comprising an oscillatable valve reversing shaft, a valve element pivotal back and forth thereon between two positions against a valve seat, a valve pressure plate having an offset spring connection, and a valve actuator likewise disposed on said shaft, said actuator comprising a disc-like member having coaxial hubs extending in opposite directions therefrom to provide an elongate bearing on said shaft, a valve shifting arm projecting from said actuator in the general direction of the axis thereof for engagement with said valve, over-center spring means acting between said arm and the offset spring connection of said pressure plate to urge said pressure plate pivotally against said valve and to constitute resilient snap action means for said valve actuator, the hub of said actuator remote from said valve having an arcuate interruption, and means rigid with said valve shaft for engagement in said arcuate interruption to constitute a play connection for intermittently operating said valve actuator through substantially continuous oscillation of said valve reversing shaft.

11. For use in snap-action mechanism wherein an energy-storing spring moves a shifter rapidly to terminal position, a shifter comprising a disc having means for pivotally mounting the same, and a shifting arm integral therewith and projecting from said disc in a direction substantially parallel to the axis thereof for engagement with a member to be shifted to and fro, said disc having its mass proportioned to the stress of the energy-storing spring whereby to impose substantial inertia resistance to acceleration thereof by said energy-storing spring and thereby quiet the snap-over action of said mechanism.

ROY C. TIMM.